(12) United States Patent
Ohtsuka et al.

(10) Patent No.: US 7,964,319 B2
(45) Date of Patent: Jun. 21, 2011

(54) FUEL CELL IN WHICH PROTON CONDUCTIVE GEL IS USED AND MANUFACTURING METHOD THEREOF, AND ELECTRIC POWER GENERATION METHOD

(75) Inventors: Takashi Ohtsuka, Osaka (JP); Tomoyuki Komori, Osaka (JP); Atsushi Omote, Osaka (JP); Yuji Zenitani, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/794,266

(22) Filed: Jun. 4, 2010

(65) Prior Publication Data
US 2010/0310960 A1    Dec. 9, 2010

Related U.S. Application Data

(63) Continuation of application No. PCT/JP2009/003793, filed on Aug. 7, 2009.

(30) Foreign Application Priority Data

May 11, 2009    (JP) .................. 2009-114288

(51) Int. Cl.
    *H01M 8/08*    (2006.01)
(52) U.S. Cl. ......... 429/498; 429/499; 429/500; 429/501
(58) Field of Classification Search ............... 429/498
    See application file for complete search history.

(56) References Cited

FOREIGN PATENT DOCUMENTS

| JP | 01-257129 | * | 4/1988 |
|----|-----------|---|--------|
| JP | 01-257129 |   | 10/1989 |
| JP | 2002-080214 |   | 3/2002 |
| JP | 2005-158646 |   | 6/2005 |
| JP | 2005-285426 |   | 10/2005 |
| JP | 2007-066668 |   | 3/2007 |
| JP | 2007-273286 |   | 10/2007 |
| JP | 2008-020411 |   | 1/2008 |
| JP | 2008-243688 |   | 10/2008 |
| WO | WO 2006/085446 A1 |   | 8/2006 |

OTHER PUBLICATIONS

Hara, S., et al., "Proton-conducting properties of hydrated tin dioxide as an electrolyte for fuel cells as intermediate temperature", Solid State Ionics, 2002, pp. 679-685, vol. 154-155, Elsevier Science B.V.
Körösi, L., et al., "Preparation and characterization of $SnO_2$ nanoparticles of enhanced thermal stability: The effect of phosphoric acid treatment on $SnO_2 \cdot nH_2O$", Colloids and Surfaces A: Physiochem Eng. Aspects, 2005, pp. 147-154, vol. 268, Elsevier B.V.
Original Japanese version of Fuji Jihou, 2002, p. 285, vol. 75 No. 5.

* cited by examiner

*Primary Examiner* — Ula C Ruddock
*Assistant Examiner* — Jacob Marks
(74) *Attorney, Agent, or Firm* — McDermott Will & Emery LLP

(57) ABSTRACT

An object of the present invention is to provide a fuel cell that operates in a temperature range of not lower than 100° C., and a method for manufacturing such a fuel cell.

The fuel cell of the present invention has a proton conductive gel, an anode electrode, and a cathode electrode,
  the proton conductor being sandwiched between the anode electrode and the cathode electrode, in which
  the proton conductive gel is composed of $SnO_2$, $NH_3$, $H_2O$, and $H_3PO_4$,
  and provided that the molar ratio represented by $NH_3/SnO_2$ is X, and the molar ratio represented by P/Sn is Y,
  X is not less than 0.2 and not greater than 5, and Y is not less than 1.6 and not greater than 3.

6 Claims, 11 Drawing Sheets

FUEL CELL IN WHICH PROTON CONDUCTIVE GEL IS USED AND MANUFACTURING METHOD THEREOF, AND ELECTRIC POWER GENERATION METHOD

This is a continuation application under U.S.C 111(a) of pending prior International application No. PCT/JP2009/003793, filed on Aug. 7, 2009, which in turn claims the benefit of Japanese Application No. 2009-114288 filed on May 11, 2009, the disclosures of which Application are incorporated by reference herein.

TECHNICAL FIELD

The present invention relates to a fuel cell which is operable in a temperature range of not lower than 100° C., and in particular, relates to a fuel cell in which a homogenous solid electrolyte material is used that is superior in weight stability and proton conductivity in a temperature range of not lower than 100° C., and a method for manufacturing the same and an electric power generation method.

BACKGROUND ART

In recent years, fuel cells have been put into practical applications as electric power generation means accompanied by less $CO_2$ emission. Although several types of fuel cells have been proposed, fuel cells which are generally referred to as PEFC (polymer electrolyte fuel cell), have been extensively developed as a typical type among them.

PEFC has a structure which includes a polymer electrolyte membrane sandwiched between electrodes (an anode and a cathode) supporting a catalyst such as Pt. By supplying a gas that contains hydrogen to the anode, and a gas that contains oxygen to the cathode, hydrogen is separated on the anode into a proton and an electron by an action of the catalyst.

Thus generated proton is transferred together with $H_2O$ in the form of an oxonium ion $H_3O^+$, and supplied to the polymer electrolyte membrane. In the polymer electrolyte membrane, only the protons migrate, the protons, oxygen and electrons form a so-called three-phase interface, on the catalyst of the cathode. Accordingly, a reaction that produces water from oxygen and the proton is caused, and thus electric power generation by the fuel cell is executed. Namely, it is important for electric power generation by fuel cells that only the protons migrate in the polymer electrolyte membrane, and that hydrogen, oxygen, and electrons are not transmitted to the opposite electrode.

Thus, in fuel cells typified by PEFC, in which electric power generation is executed by proton transfer, proton conductor plays an important role in proton transfer at the electrode and the electrolyte membrane. Therefore, proton conductors have been extensively developed, along with the development of fuel cells.

However, the electric power generation efficiency of PEFC is still so low. Therefore, improvement of the reaction efficiency of the catalyst in the electrode, and improvement of the proton conduction in the polymer electrolyte membrane are important for improving the electric power generation efficiency of PEFCs. In particular, since the reaction efficiency of the catalyst greatly depends on the reaction temperature, the most effective means for increasing electric power generation efficiency is elevation of the reaction temperature of the catalyst of PEFC, namely elevation of the operation temperature of PEFC.

However, since mechanisms of proton transfer in the polymer electrolyte membranes involve oxonium ($H_3O^+$) conduction via $H_2O$ that is present in the polymer chain, it is difficult to allow PEFC to generate electric power under an ambient pressure at not lower than 100° C. This is because water vaporizes under an ambient pressure at 100° C., and it is difficult to permit stable presence of $H_2O$ in the polymer electrolyte membrane at not lower than 100° C.

On the other hand, some of phosphoric acid type fuel cells (PAFCs) have been put into practical applications. Since the PAFCs use phosphoric acid as an electrolyte, electric power generation at around 200° C. is enabled. However, PAFC involves a specific problem of necessity for measures against corrosion and leakage of liquids since phosphoric acid that is an acidic liquid is used.

Accordingly, operation of fuel cells within a temperature range of approximately 100° C. to 300° C., which is referred to as middle temperature range, is advantageous. However, there still exists a problem of absence of a proton conductor which is most suited for such fuel cells.

Proton conductors are broadly classified into proton conductors intermediated by $H_2O$ (i.e., proton conductors in which conduction of $H_3O^+$ is utilized), and proton conductors that conduct $H^+$ without intermediation of water. According to the proton conductors intermediated by $H_2O$, it is difficult to allow $H_2O$ that serves as a conducting medium to be stably present at a temperature within the range of not lower than 100° C. On the other hand, as the proton conductor that conducts only $H^+$, perovskite type oxides such as $SrZr_{1-x}Y_xO_3$ based conductors have been known. However, in the case of the proton conductors composed of perovskite type oxides, the temperature at which proton can be conducted is not lower than 400° C.; therefore, operation temperature is likely to be too high.

As described above, there hardly exist proton conductors without intermediating $H_2O$ which are stably present within a temperature range of not higher than 300° C. Particularly, for realizing fuel cells that are operable in a temperature range of 100° C. to 200° C., the most crucial point is as to how stably $H_2O$ is allowed to exist in a proton conductor.

Transmission of fuels ($H_2$, $O_2$) in the fuel cells may lead to deterioration of electric power generation efficiency. Therefore, proton conductors desirably have low gas permeability such as, for example, compact membranes and gels. Similarly, also in light of affinity and adhesiveness with an electrode, membranes or gels being compact are desired.

Conventionally, a variety of materials that exhibit proton conductivity at a temperature of not lower than 100° C. have been proposed.

For example, according to Nonpatent Document 1, tin oxide hydrates ($SnO_2 \cdot nH_2O$) have favorable proton conductivity. $SnCl_4$ that is a water soluble substance is dissolved in water, and then an equal amount of $NH_4OH$ is added thereto to allow $Sn(OH)_4$ to be formed. Thus obtained precipitates, $Sn(OH)_4$ are sufficiently washed with water to remove $NH_4^+$ and $Cl^-$ ions, and then heated to 110° C. to obtain $SnO_2 \cdot nH_2O$ powders.

In Nonpatent Document 1, $SnCl_4$ is used as a water soluble Sn compound and neutralized with $NH_4OH$ to form $Sn(OH)_4$, which is a hydrozide salt. It is to be noted that $Sn(OH)_4$ and $SnO_2 \cdot nH_2O$ are insoluble in water.

The $SnO_2 \cdot nH_2O$ powders include both adsorbed water and bound water. Nonpatent Document 1 reports that when weight variation from room temperature to 500° C. is studied, the adsorbed water desorbs in a temperature range of 25° C. to 130° C., and then the bound water desorbs in a temperature range of 150° C. to 350° C. On the basis of the weight when the temperature is elevated to 350° C., desorption of water of not less than 50% occurs through elevating the temperature by 200° C.

$SnO_2 \cdot nH_2O$ disclosed in Nonpatent Document 1 is powdery. When adsorbed water more likely to be desorbed is removed, the amount of $H_2O$ relative to the entire powder is approximately 20% by weight in the case of n=2.

Patent Document 1 has proposed tin oxide hydrate, namely a complex of $SnO_2 \cdot nH_2O$ obtained by conjugation with ceramic porous particles in order to maintain a water holding capacity in a temperature range of not lower than 100° C. Patent Document 1 discloses that ceramics porous particles are dispersed in, for example, a $SnO_2 \cdot nH_2O$ matrix to provide the hydrate with moisture supplied from pores of ceramics particles, and thus water holding capacity is improved as compared with the case of $SnO_2 \cdot nH_2O$ alone even in a temperature range of not lower than 100° C.

Therefore, the conductors disclosed in Patent Document 1 are powders and molded products thereof, and the proportion of $H_2O$ adsorbed in the porous particles relative to the $H_2O$ content similar to that of Nonpatent Document 1 will account for the proportion of the adsorbed $H_2O$ amount relative to the entire $H_2O$.

Patent Document 2 discloses a solid electrolyte membrane that is a layered phosphoric acid compound ($Sn(HPO_4)_2 \cdot nH_2O$ etc.), which is characterized by having a molar ratio of Sn/P of 0.3 to 0.8. Patent Document 2 discloses that crystalline tin phosphate results in a high proton conductivity of approximately $10^{-2}$ to $10^{-3}$ S/cm at 150° C.

According to Patent Document 2, the layered phosphoric acid compound is powdery.

The Nonpatent Document 2 discloses that a mixture of nanoparticles $SnO_2$ and phosphoric acid ($H_3PO_4$) is superior in thermal stability. Furthermore, Nonpatent Document 2 also discloses that mixing of nanoparticles $SnO_2$ with phosphoric acid improves water holding capacity. Namely, network between $SnO_2$ and $H_3PO_4$ is disclosed to provide high water holding capacity.

Patent Document 3 discloses a proton conductor having a $P_2O_5$ or phosphoric acid group on the fine pore surface or inside the fine pore structure of a nano porous material of one metal oxide selected from tin oxide, vanadium oxide, tungsten oxide and manganese oxide. According to Patent Document 3, by forming $P_2O_5$ or phosphoric acid groups in fine pores, the $P_2O_5$ or phosphoric acid groups reportedly bind to water by a binding force that is greater than van der Waals attraction.

The proton conductor disclosed in Patent Document 3 is powdery. Thus, in order to improve water holding capacity, doping of nano porous fine pores with $P_2O_5$ or phosphoric acid groups is carried out. Construction of a network consisting of fine pores of oxides, $P_2O_5$ or phosphoric acid groups, and $H_2O$ improves the water holding capacity. Patent Document 3 describes that the network disclosed in Patent Document 3 is superior in water holding capacity as compared with the $SnO_2$—$H_3PO_4$ network disclosed in Nonpatent Document 2.

As gelatinous substances in which $SnO_2$ is used, Patent Document 4 discloses a gel in which $SnO_2$, Sb, and $NH_3$ are used. According to Patent Document 4, the gel is produced in the step of preparing a material having electron conductivity of $SnO_2$.

As in the foregoing, a large number of proton conductors for operating fuel cells at temperatures of not lower than 100° C. have been proposed.

As an example of a practically applied fuel cell operated in a temperature range of approximately 200° C., PAFC in which liquid $H_3PO_4$ is used has already put into practical applications (Nonpatent Document 3).

[Citation List]

[Patent Documents]

Patent Document 1: Japanese Patent Laid-Open Publication No. 2007-273286

Patent Document 2: Japanese Patent Laid-Open Publication No. 2005-285426

Patent Document 3: Japanese Patent Laid-Open Publication No. 2007-66668

Patent Document 4: Japanese Patent Laid-Open Publication No. 1-257129

Patent Document 5: Japanese Patent Laid-Open Publication No. 2008-243688 (in particular, paragraph No. 0034)

Patent Document 6: Japanese Patent Laid-Open Publication No. 2008-020411 (in particular, paragraph Nos. 0013 to 0017)

[nonpatent documents]

Nonpatent Document 1: Shinji Hara et. al. Solid state Ionics 154-155 (2002) 679-685.

Nonpatent Document 2: Colloids and Surfaces A: Physicochem. Eng. Aspects 268 (2005) 147-154.

Nonpatent Document 3: Fuji Jihou Vol. 75 No. 5 (2002) 285.

SUMMARY OF THE INVENTION

Technical Problem

However, conventionally disclosed fuel cells have the following problems.

In fuel cells such as PEFCs etc., in which electric power is generated by proton transfer, a proton conductor should not permit the transmission of hydrogen, which had been supplied to the anode side, to the cathode side. Therefore, the proton conductor must have high ability to prevent the transmission of hydrogen. Thus, it is not desired that this type of proton conductor is composed of particles having pores, or a solid having air holes.

Furthermore, in order to enhance the electric power generation efficiency of fuel cells, the proton conductor should have high proton conductivity. Since substantial proton conductivity is improved as the proton conductor has a smaller thickness, particulate forms can be problematic in terms of practical applications.

In order to use a proton conductor in fuel cells, it is important that the proton conductor has thermal stability, in light of achievement of high proton conductivity, and retainment of structural stability of the fuel cell. Namely, when a large amount of $H_2O$ that involves in proton conduction at not lower than 100° C. moves in and out, deterioration of shape stability as a proton conductor, as well as stability of the proton conductivity may raise problems.

According to the powdery proton conductors disclosed in Nonpatent Document 1, and Patent Document 1 and Patent Document 2, desorption of the adsorbed water are obliged at approximately 100° C., and thus the state with less water on the surface of the powder occurs, leading to problems such as low proton conductivity, and formation of pores among particles.

Nonpatent Document 2 discloses that when $SnO_2$ is mixed with $H_3PO_4$ to provide a proton conductor, thermal stability is improved. However, when the present inventors carried out a supplementary examination, it was proven that a mixture of $SnO_2$ colloid particles with phosphoric acid is in the form of a liquid, and $SnO_2$ particles are aggregated and precipitated when left to stand for a long period of time to cause separation in the solution. In addition, the composition of the layered phosphoric acid compound is represented by $Sn(HPO_4)_2 \cdot nH_2O$, which forms a different crystal system from $SnO_2$.

Also according to the powdery proton conductor disclosed in Patent Document 3, film thinning is similarly difficult, leading to problems in forming a minute region, such as conjugation with an electrode. The proportion of $H_2O$ occupying the particles is estimated to be approximately 20% by weight similarly to Patent Document 1, Patent Document 2 and Nonpatent Document 1. When the water content is higher than 20% by weight, phase separation is caused between oxide particles and water. Therefore, it is difficult, in principle, to increase the amount of $H_2O$ and allow many proton conduction paths to exist.

Patent Document 4 discloses formation of an electron conductive membrane by obtaining a gel composed of $SnO_2$, Sb and $NH_3$, and thereafter applying an aqueous solution in which the gel is dissolved. However, Patent Document 4 does not disclose properties, characteristics and moisture retention capacity of the gel. In addition, the disclosed gel has a weight ratio of $SnO_2$ being 32.1% and $NH_3$ being 0.38%, which can be converted into a molar ratio of $SnO_2:NH_3$ being 213:22.

Namely, the molar ratio represented by $NH_3/SnO_2$ is 0.10, revealing an intermediate product formed as a gel in a region including more $SnO_2$ than $NH_3$. It is impossible for the gel having such a composition region to have properties satisfactory as a proton conductive gel.

The foregoing problems in prior arts can be summarized as in the following.

For ensuring shape thermal stability and proton conductivity of a proton conductor at 100° C., it is necessary that the conductor is composed of a material which has a high proportion of water occupying the entire material, and exhibits less desorption of water at a temperature in the range of not lower than 100° C. Furthermore, it is necessary that binding of the material and water in the material forms a network in the proton conductor, forming a structure having fewer pores such that water is not easily desorbed. However, the proton conductors according to the aforementioned prior arts do not satisfy these requirements. Therefore, construction of a network superior in water holding capacity has been a key point in proton conductors.

The present inventors discovered that a gel having superior water holding capacity, thermal stability and shape stability, not accompanied by phase separation can be produced on the basis of a state formed by dispersing $SnO_2$ particles and $NH_4^+$, and adding $H_3PO_4$ thereto to form a network of the binding of the constituents with water.

Namely, the present inventors discovered that by providing a proton conductor in a cluster state in which ions of the constituents strongly interact with one another, desorption of $H_2O$ due to heat can be prevented, and thus a gelatinous state not accompanied by fluidity like a liquid can be formed even in a minute region.

Furthermore, such a gelatinous state is distinct from a state in which a plurality of constituents forms a compound, and mixed with $H_2O$. It is assumed that $SnO_2$ particles cause an electrostatic interaction with ions of other constituents to forma stable cluster region as a whole gel, rendering to be in a state having water holding capacity, thermal stability and shape stability expressed therein. Additionally, the present inventors also discovered that it is important for the proton conductive material to have a specific composition in order to form such a gelatinous state.

In addition, the present inventors succeeded in forming a binding state with a higher $H_2O$ content and favorable thermal stability by setting the component materials of the proton conductor in a specified proportion, and revealed that such a binding state depends on how the constituting elements can form a network.

Fuel cells in which the proton conductive material as described above is used are operable in a temperature range of not lower than 100° C., and a fuel cell system enabling stable operation even though a slight change occurs in the operation temperature can be put into practice.

Accordingly, the present invention provides a fuel cell in which a proton conductive gel having a composition that allows the water content in the material to be stably present even in a temperature range of not lower than 100° C. is used, and a method for manufacturing such a fuel cell.

Solution to Problems

The fuel cell of the present invention in which a proton conductive gel is used for solving the foregoing problems is characterized by use of a proton conductive gel prepared by mixing $H_3PO_4$ with a dispersion solution composed of $SnO_2$, $NH_3$ and $H_2O$ as a proton conductor to form a network of the constituents.

Since the proton conductive gel of the present invention is a gel having a high water content, and having a network structure of $SnO_2$, $NH_3$ and $H_3PO_4$ with each other, it has a high water content at a temperature of not lower than 100° C. and has a superior water holding capacity, also with superior thermal stability and proton conductivity. In addition, the gel is homogeneous without being accompanied by phase separation.

The network state refers to a state in which each of the constituents electrically assemble to result in stabilization, and this state is believed to involve potent interactions. Such interactions enable $H_2O$ to be stably present for a long period of time in a temperature range of not lower than 100° C.

Therefore, use of such a gel as a proton conductor enables a fuel cell to be operated in a temperature range of not lower than 100° C.

Specifically, according to an aspect of the present invention, a fuel cell is provided having
a proton conductive gel,
an anode electrode, and
a cathode electrode,
the proton conductive gel being sandwiched between the anode electrode and the cathode electrode, wherein
the proton conductive gel is composed of $SnO_2$, $NH_3$, $H_2O$, and $H_3PO_4$,
and provided that the molar ratio represented by $NH_3/SnO_2$ is X, and the molar ratio represented by P/Sn is Y,
X is not less than 0.2 and not greater than 5, and Y is not less than 1.6 and not greater than 3.

In the fuel cell of the present invention, by making the composition of the proton conductive gel have a molar ratio X represented by $NH_3/SnO_2$ in the range of not less than 0.2 and not greater than 5, a homogenous gel can be obtained without causing cloudiness and precipitation.

Moreover, setting a molar ratio Y represented by P/Sn to fall within the range of not less than 1.6 and not greater than 3 enables a homogenous gel without precipitation and cloudiness to be obtained, and the gel exhibits a weight loss percentage of not greater than 6% in a temperature range of 100° C. to 200° C.

Furthermore, the proton conductive gel produced to exhibit the molar ratios X and Y in the range described above is superior in the water holding capacity even at a temperature of not lower than 100° C., and has favorable proton conductivity.

Constructing a fuel cell by sandwiching the proton conductive gel that exhibits the molar ratios X and Y described above between electrodes having a catalyst supported enables the fuel cell to be stably operated even at a temperature of not lower than 100° C.

The aforementioned proton conductive gel preferably has a conductivity of not less than $10^{-3}$ S/cm in the temperature range of not lower than 100° C. and not higher than 200° C.

Another aspect of the present invention relates to a method for manufacturing a fuel cell having a proton conductive gel, an anode electrode, and a cathode electrode, the method comprising the steps of: mixing $H_3PO_4$ with a solution composed of $SnO_2$, $NH_3$, and $H_2O$ to obtain the proton conductive gel, in which provided that the molar ratio represented by $NH_3/SnO_2$ is X, the molar ratio represented by P/Sn is Y, X is not less than 0.2 and not greater than 5, and Y is not less than 1.6 and not greater than 3; and sandwiching the proton conductive gel between the anode electrode and the cathode electrode, in this order.

In the method for manufacturing the fuel cell of the present invention, $H_3PO_4$ is mixed with a solution in which $SnO_2$ particles, $NH_4$ and $H_2O$ are dispersed, and the molar ratios of $NH_3/SnO_2$ and P/Sn are adjusted in a specified range to produce a proton conductive gel. Since this proton conductive gel has a state that enables interaction of all the constituents including $H_2O$, construction of a network that is superior in the water holding capacity is enabled.

In addition, still another aspect of the present invention relates to a method for generating an electric power by a fuel cell, the fuel cell having a proton conductive gel, an anode electrode, and a cathode electrode, the proton conductive gel being sandwiched between the anode electrode and the cathode electrode, wherein the proton conductive gel is composed of $SnO_2$, $NH_3$, $H_2O$, and $H_3PO_4$, provided that the molar ratio represented by $NH_3/SnO_2$ is X, and the molar ratio represented by P/Sn is Y, X is not less than 0.2 and not greater than 5, and Y is not less than 1.6 and not greater than 3, and wherein the method includes the step of:

supplying hydrogen to the anode electrode and supplying oxygen to the cathode electrode while maintaining the fuel cell in a temperature range of not lower than 100° C. and not higher than 200° C. to generate a potential difference between the anode electrode and the cathode electrode.

The above objects, other objects, features and advantages of the present invention will be apparent from the following detailed description of preferred embodiments with reference to attached drawings.

Advantageous Effects of Invention

According to the present invention, by using a homogenous proton conductive gel that is superior in water holding capacity in a temperature range of 100° C. to 200° C., a fuel cell operable at a temperature of not lower than 100° C. can be realized.

DESCRIPTION OF EMBODIMENTS

Hereinafter, embodiments of the present invention are explained with reference to drawings.

Embodiment 1

Figure 1:
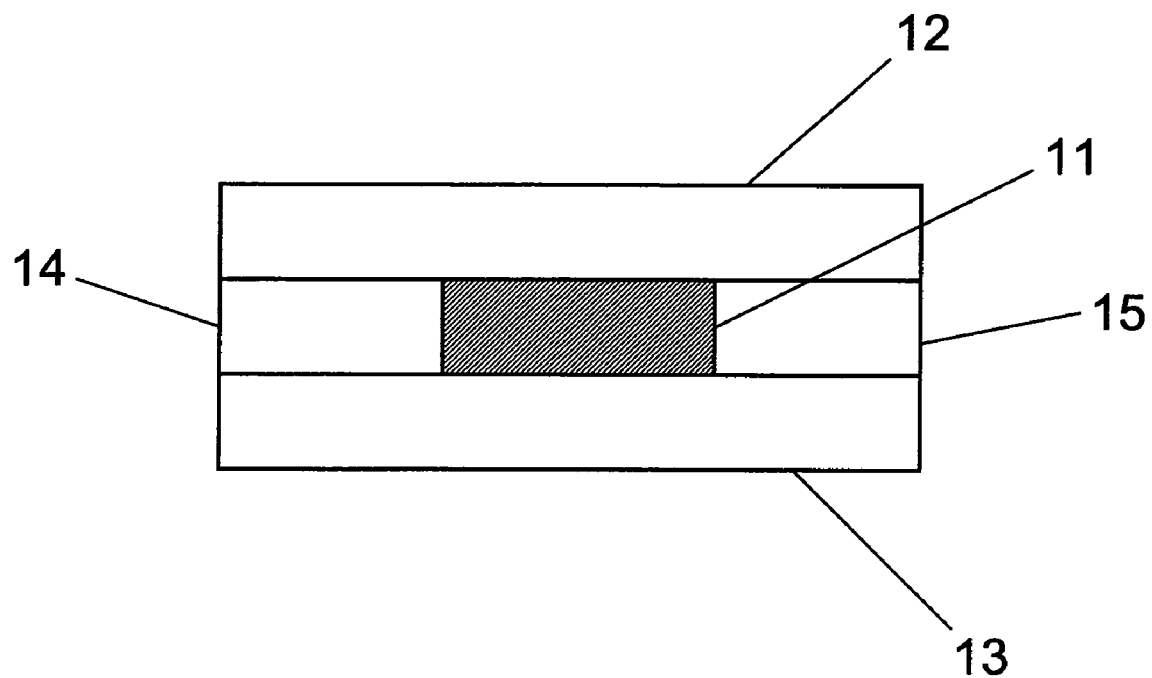
FIG. 1 shows a schematic configuration view illustrating a fuel cell in which a proton conductive gel is used according to Embodiment 1 of the present invention.

FIG. 1 shows a schematic configuration view of the fuel cell in the present invention.

Figure 2:
FIG. 2 shows a photograph illustrating an external view of the proton conductive gel according to Embodiment 1 of the present invention.

FIG. 1 shows only the elements required for description of the function. In addition, FIG. 2 shows an external view of the proton conductive gel in the fuel cell of the present invention in which a proton conductive gel is used.

In FIG. 1, the numeral "11" indicates a proton conductive gel, "12" indicates an anode electrode, "13" indicates a cathode electrode, and "14" and "15" indicate an insulator.

As shown in FIG. 1, the fuel cell of the present invention has a structure in which the proton conductive gel 11 is sandwiched between the anode electrode 12 and the cathode electrode 13. The anode electrode 12 and the cathode electrode 13 support a catalyst of fine particles in a nanometer size such as Pt fine particles (not shown in the Figure). The insulators 14 and 15 insulate electrons and ions to prevent conduction of ions and electrical short between the anode electrode 12 and the cathode electrode 13. The proton conductive gel 11 is obtained by mixing $H_3PO_4$ with a solution composed of $NH_3$, $SnO_2$ and $H_2O$ to form a network of these components.

Herein, provided that the molar ratio represented by $NH_3/SnO_2$ is X, and the molar ratio represented by P/Sn is Y, X and Y satisfy the formulae of: $0.2 \leq X \leq 5$, and $1.6 \leq Y \leq 3$, respectively. In mixing $H_3PO_4$, the solution is preferably heated. The fuel cell of the present invention is characterized by use of this proton conductive gel 11.

The fuel cell having the structure as described above has favorable proton conductivity even in a temperature range of not lower than 100° C. since the proton conductive gel 11 has a water holding capacity. Thus, electric power generation at a temperature which is not lower than 100° C. (preferably not higher than 200° C.) can be realized.

In the fuel cell of the present invention, by supplying a gas containing hydrogen to the anode electrode 12, and a gas containing oxygen to the cathode electrode 13, electrons and protons are produced by virtue of the catalyst supported on the anode electrode (not shown in the Figure). Thus produced protons reach the cathode electrode 13 after conducting through the proton conductive gel 11, and binding to oxygen on the catalyst inside the cathode electrode 13 results in achievement of operation of the fuel cell. In this operation, the electrons are supplied to the cathode electrode 13 via the external circuit.

It should be noted that the fuel cell of the present invention is not limited to the structure shown in FIG. 1, and the functions are performed as long as the proton conductive gel 11 having proton conductivity is provided between the anode electrode 12 that separates a gas containing hydrogen into electrons and protons, and the cathode electrode 13 for allowing the gas containing oxygen to bind to the protons.

Next, features of the proton conductive gel 11 in the fuel cell shown in FIG. 1 are described in detail.

The proton conductive gel 11 shown in FIG. 1 is produced by mixing $H_3PO_4$ with a solution composed of $SnO_2$ particles, $NH_3$ and $H_2O$, followed by heating. The proton conductive gel 11 in the present invention is a homogeneous gelatinous substance being accompanied by no phase separation as shown in FIG. 2, and has a network structure of the $SnO_2$ particles, $NH_3$, $H_2O$ and $H_3PO_4$ in the gel.

The state of forming a network refers to a state in which constituents of the proton conductive gel are present stably while keeping their interaction, without producing any compound. When the proton conductive gel in such a state is subjected to crystal evaluation by an X-ray diffraction, only diffraction peak of $SnO_2$ particles is detected.

The proton conductive gel is in a gelatinous state not exhibiting fluidity. The gelatinous state not exhibiting fluidity as referred to herein is defined as a state of a gel, when pushed out from a glass tube having a diameter of 1 cm to place on a glass substrate and thereafter left to stand for 1 hour, has the profile area changed within the range of four times the diameter of the glass tube.

In addition, when the molar ratio X represented by $NH_3/SnO_2$ is in the range of not less than 0.2 and not greater than 5, and the molar ratio Y represented by P/Sn is in the range of not less than 1.6 and not greater than 3, a stable gelatinous state forming a network as described above can be maintained without causing phase separation and precipitation. Such a proton conductive gel has superior water holding capacity and proton conductivity even in a temperature range of not lower than 100° C.

By sandwiching the proton conductive gel having the features as described above between an anode electrode and a cathode electrode, operation of a fuel cell at a temperature which is not lower than 100° C. is enabled. Since the proton conductor has a gelatinous state, diffusion of the gas can be prevented, liquid dripping which may be problematic when a liquid such as $H_3PO_4$ is used does not occur, leading to simplification of the mechanisms for maintaining the shape of the proton conductor.

Example 1

Hereinafter, Production Examples of the proton conductive gel used in the present invention, their properties and structures are described in detail. Construction Examples of fuel cells are also described in detail.

Figure 3:
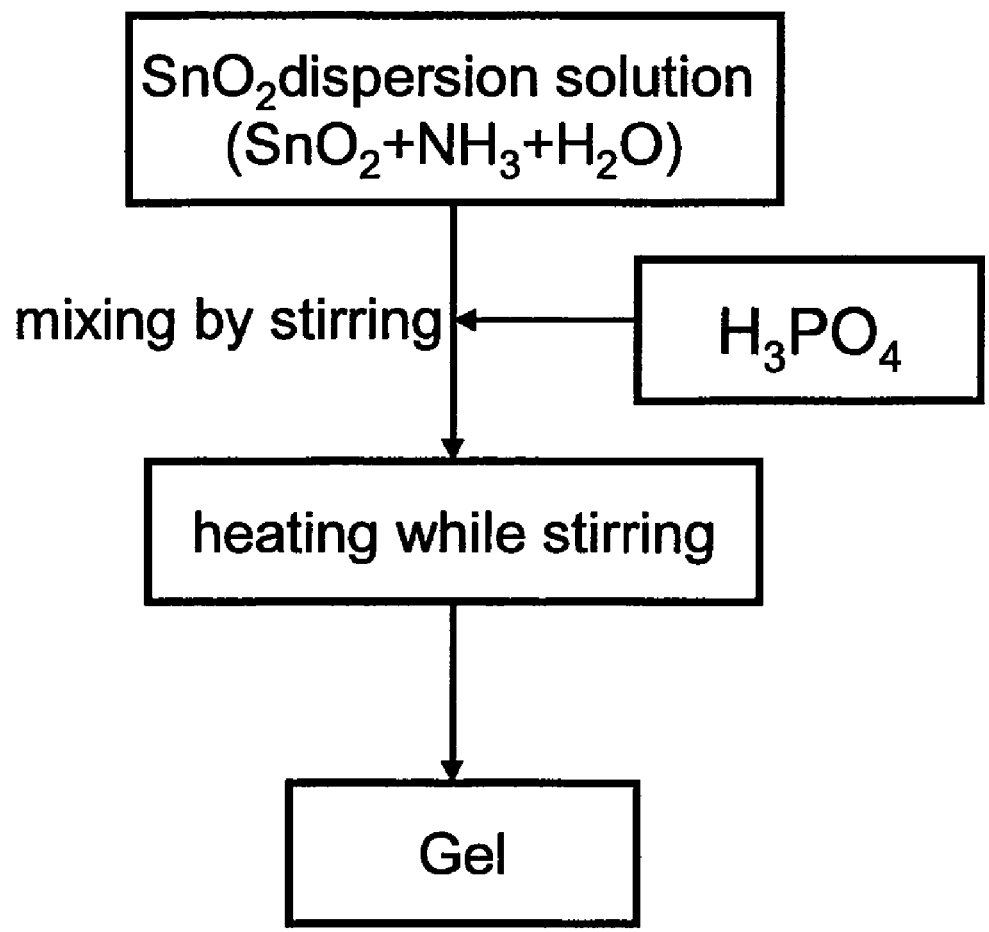
FIG. 3 shows a flow chart illustrating a production procedure of the proton conductive gel of the present invention.
Figure 4:
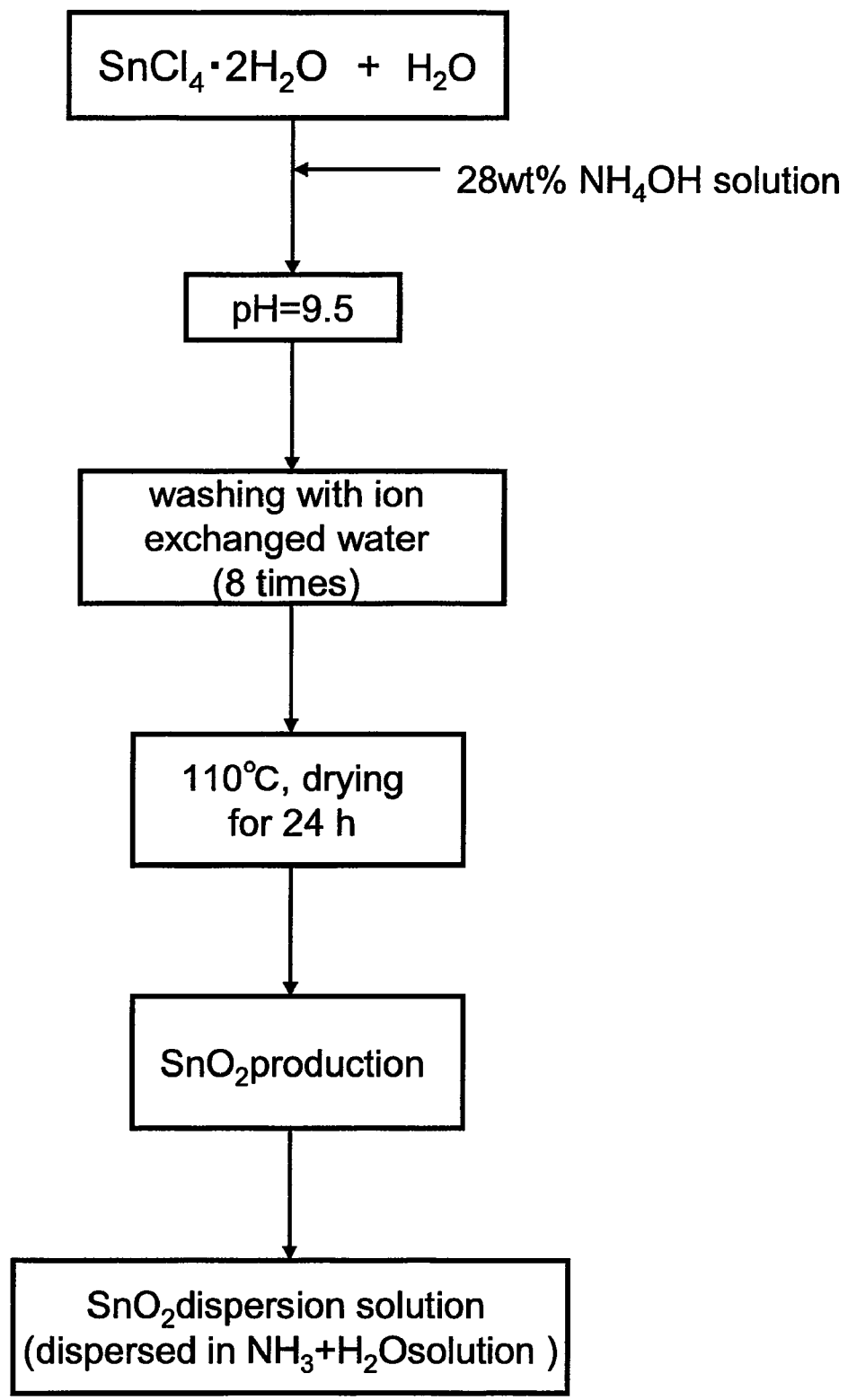
FIG. 4 shows a flow chart illustrating a production procedure of a $SnO_2$ solution with $NH_3$ dispersion.

FIG. 3 shows a production procedure of the proton conductive gel used in the present invention. Further, FIG. 4 shows a method for preparing $SnO_2$ particles dispersed with $NH_3$ for use in production of a proton conductive gel.

First, an $SnO_2$ colloid (particle size: 2 nm) dispersed with $NH_3$ was provided as $SnO_2$. The $SnO_2$ colloid used was a material prepared with a conventional method. In addition, as shown in FIG. 4, $SnCl_4.2H_2O$ can be also used as a starting material.

40 g of a $SnO_2$ dispersion solution having a composition of X=0.2 was weighed as a starting material. The $SnO_2$ content was 8% by weight. This $SnO_2$ dispersion solution which was dispersed with $NH_3$ was colorless and transparent, and had a state in which $SnO_2$ fine particles were dispersed in $H_2O$.

The distribution of the $SnO_2$ particle size was determined using a dynamic light scattering method. It was ascertained that the primary particle size had a peak around 2 nm, whereas the secondary particle size had a peak around 17 nm. Namely, it was proven that the $SnO_2$ particles had a dispersed state in $H_2O$ although a part of them aggregate.

It was believed that $NH_3$ presents as a counter ion on the surface of $SnO_2$, and plays a role in preventing aggregation of the $SnO_2$ particles in this state.

Next, to 40 g of a solution of $SnO_2$ particles dispersed with $NH_3$ was added a 28% by weight $NH_4OH$ solution for changing the amount of $NH_3$, and $SnO_2$ dispersion solutions having varying arbitrary numerical values to give the X value of from 0 to 200 were also prepared. On the other hand, 85% $H_3PO_4$ prepared at a room temperature was added to the solution of $SnO_2$ particles dispersed with $NH_3$ such that the P/Sn ratio, the Y value, became 1 to 5. According to the method for production as described above, the samples were prepared such that X value became 0 to 200, and Y value became 1 to 5.

In this procedure, the X value was adjusted first, and the Y value was thereafter adjusted. As $H_3PO_4$ was added for adjusting the Y value, the state of $SnO_2$ particles is altered from dispersed state to aggregated state, thus making the aqueous solution of $SnO_2$ particles clouded. This state was presumed to be a nonhomogenous state in which $SnO_2$ particles were aggregated due to excessively added $H_3PO_4$, which leads to loss of homogenous dispersion of $SnO_2$.

Decrease of $NH_3$ to allow the X value of the aqueous solution of the $SnO_2$ particles to approximate 0 lead to failure in maintaining dispersion of the $SnO_2$ itself. When the X value is smaller than 0.2, precipitation occurred due to aggregation of $SnO_2$ itself.

After the solutions were prepared to have predetermined X value and Y value with arbitrary ratios, each sample was heated to 80° C., and mixed by stirring for 12 hrs. After completing the foregoing steps, the samples were sorted into: one being transparent and gelatinous; one being clouded; and one not being gelated. Table 1 shows the results. In Table 1, "A" indicates a sample being transparent and gelatinous, and "B" and "C" indicate a clouded sample.

TABLE 1

| | P/Sn | Y | | | | | | |
|---|---|---|---|---|---|---|---|---|
| X | | 1 | 1.6 | 2 | 3 | 4 | 5 | 10 | 20 |
| $NH_3/SnO_2$ | 0.1 | B | D | D | D | D | D | D | D |
| | 0.2 | B | A | A | A | D | D | D | D |
| | 5 | B | A | A | A | D | D | D | D |
| | 8 | C | C | C | C | C | C | C | C |

TABLE 1-continued

| | P/Sn | | | Y | | | | | |
|---|---|---|---|---|---|---|---|---|---|
| | 20 | C | C | C | C | C | C | C | C |
| | 200 | C | C | C | C | C | C | C | C |

A: gel
B: $SnO_2$, clouded
C: ammonium phosphate, precipitated
D: not gelated

From the results shown in Table 1, it was confirmed that the precipitation and cloud assumed to result from aggregation of $SnO_2$ occurred when the X value was less than 0.2, and the cloud also occurred when the X value was in the range exceeding 5. On the other hand, the sample was gelatinous when the Y value was in the range of not less than 1.6 and not greater than 3, whereas the sample failed to be gelatinous and had fluidity when the Y value was in the range of less than 1.6, and also in the range exceeding 3.

From the foregoing results, it was proven that the sample had homogeneity in the form of a gel when the X value was in the range of not less than 0.2 and not greater than 5, and when the Y value was in the range of not less than 1.6 and not greater than 3.

When the $SnO_2$ solution dispersed with $NH_3$ was used, a finally transparent gelatinous state was achieved; however, when $NH_3$ and $H_2O$ were added to $SnO_2$ fine particles of, for example, 2 nm in size, it was difficult to homogenously disperse the $SnO_2$ fine particles.

In addition, the gelatinous state in the present invention refers to a state which hardly exhibits fluidity as described above, and is defined as a state of a gel, when pushed out from a glass tube having a diameter of 1 cm to place on a glass substrate and thereafter left to stand for 1 hour, has the profile area changed within the range of four times the diameter of the glass tube.

Next, evaluation of the proton conductive gel produced as described above was made as in the following.

First, in order to confirm as to whether or not the crystal in the proton conductive gel (i.e., $SnO_2$), reacted with $NH_3$ and $H_3PO_4$, X-ray diffraction was employed to analyze the gel. In addition, thermal analysis of the obtained gel was carried out to determine the amount of included $H_2O$, desorption of $H_2O$ in a temperature range of not lower than 100° C., and occurrence or failure of the reaction of the constituents.

Namely, when a reaction accompanied by in-and-out of a large amount of substances of the constituents, or weight loss accompanied by release of $H_2O$ occurs in a temperature range of not lower than 100° C., change of shape, or contraction of the proton conductor is caused. Thus, when application to fuel cells as a proton conductor at a temperature of not lower than 100° C. is envisaged, the absence of a reaction in-and-out of a large amount of substances is important.

From the analysis of the $H_2O$ content and the thermal analysis, the water content of the conductive gel used in the present invention when the temperature is 100° C., and change in the water content at 100° C. to 200° C. were determined to evaluate the water holding capacity of the gel of the present invention. Moreover, proton conducting characteristic of the conductive gel used in the present invention was evaluated.

Figure 5:
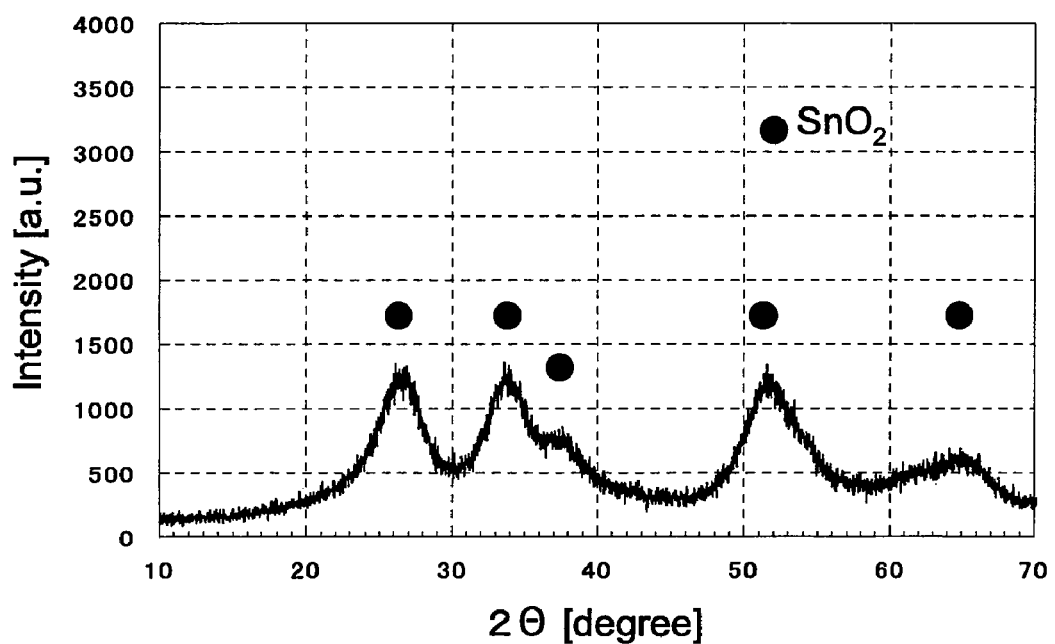
FIG. 5 shows a X-ray diffraction graph obtained after elevating the temperature of the proton conductive gel (X=0.2, Y=3) in the present invention to 200° C.

FIG. 5 shows the results of the X-ray diffraction. In FIG. 5, diffraction pattern is shown obtained after heating to 200° C. the proton conductive gel having the X-value of 0.2 and Y-value of 3. As shown in FIG. 5, only a diffraction peak based on $SnO_2$ was decided to represent a crystal, and the diffraction peak was a broad one. Namely, $SnO_2$ alone was crystallized in the proton conductive gel in the present invention, and the particle size was speculated to be significantly small. However, the reaction with $H_3PO_4$ or $NH_3$ was not found from the X-ray diffraction, and thus it was believed that precipitation of a large amount of crystal or generation of a reactant did not occur.

On the other hand, from the results of particle size determination by a dynamic scattering method, a peak was observed at 46 nm in the case of X=0.2 and Y=2, and thus it was proven that $SnO_2$ particles themselves did not react with $NH_3$ and $H_3PO_4$, and also that $NH_3$, $H_3PO_4$ and $H_2O$ did not react. However, it was revealed that $SnO_2$ particles had a particle size greater than that of the starting point.

Although $SnO_2$, $NH_3$, $H_2O$ and $H_3PO_4$ were present in their ionized states in an aqueous solution, it was inferred that these ions were present stably following cluster formation with potent electrostatic interaction. Such a state was believed to be a so-called network state, in which each of the constituents was assumed to be stably present in a state strongly interacted without forming a compound. Then, it was speculated that being in such a stable state is greatly responsible for thermal stability and proton conductivity of the conductive gel described later.

Figure 6:
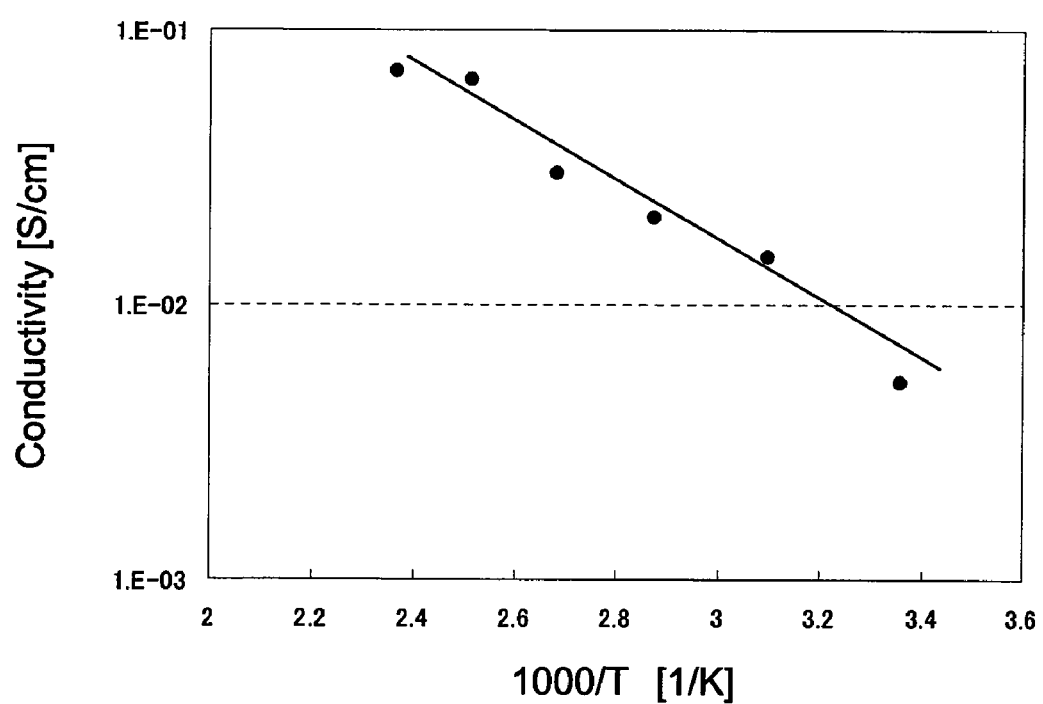
FIG. 6 shows a graph demonstrating a proton conducting characteristic of the proton conductive gel (X=0.2, Y=3) in the present invention.

FIG. 6 shows the results obtained by producing the proton conductive gel having X of 0.2 and Y of 3 and determining the proton conducting characteristic. The measurement of the proton conductivity was carried out on a sample piece having a cross sectional construction as show in FIG. 7. In addition, Table 2 shows the conductivity of the conductive gel having each composition at 100° C.

TABLE 2

| | P/Sn | | | Y | | | | | |
|---|---|---|---|---|---|---|---|---|---|
| $NH_3/SnO_2$ | | 1 | 1.6 | 2 | 3 | 4 | 5 | 10 | 20 |
| X | 0.1 | | | | | | | | |
| | 0.2 | $2.3 \times 10^{-5}$ | $1.0 \times 10^{-2}$ | 2.8 | $2.0 \times 10^{-1}$ | | | $5.0 \times 10^{-5}$ | |
| | 5 | | $2.1 \times 10^{-3}$ | | $3.9 \times 10^{-3}$ | | | | |
| | 8 | | | | $2.7 \times 10^{-5}$ | | | | |
| | 20 | | $3.2 \times 10^{-4}$ | | $1.4 \times 10^{-4}$ | | | | |
| | 200 | | | | | | | | |

100° C.

Figure 7:
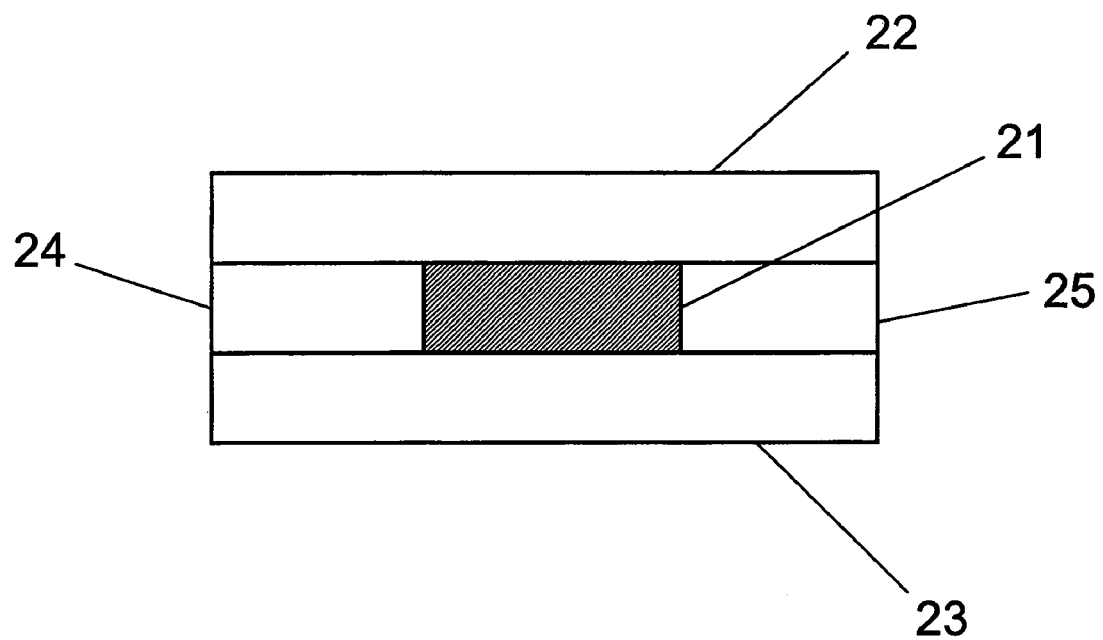
FIG. 7 shows a schematic configuration view of a sample piece upon measurement of the proton conductivity of the proton conductive gel in the present invention.

FIG. 7 shows a sample piece for measuring the proton conductivity, being a schematic view of a cross sectional structure of the sample piece having a proton conductive gel and electrodes formed therein. In FIG. 7, the numeral "21" indicates a proton conductive gel, "22" and "23" indicate an electrode sheet, and "24" and "25" indicate an insulator. The sample piece shown in FIG. 7 was produced according to the following procedure.

The electrode sheet 22 having a size of x 18 mm square with a thickness of about 0.135 mm and composed of carbon fibers having a diameter of 20 micron was provided. A polyimide film having a size of 8 mmφ with a thickness of 200 microns was used as insulators 24 and 25, and disposed on electrode sheets 22 and 23, respectively. The proton conductive gel 21 having arbitrary X and Y values was produced, and the proton conductive gel was dripped on the insulator 24 or 25, which was thereafter sandwiched with another electrode sheet. Then, the whole was fixed with a spring member (not shown in the Figure), to permit fitting. Thus, a test piece for measurement of proton conductivity was obtained.

The measurement of the proton conductivity was carried out according to an alternating-current impedance measurement method using a network analyzer. Upon the measurement, direct current was measured concomitantly, and the direct current resistance component was removed from total conductivity.

As a result, the proton conductivity increased along with elevation of the temperature, and achievement of high conductivity of $10^{-1}$ S/cm was proven even in a temperature range of not lower than 100° C.

For operating the fuel cell, the proton conductivity is preferably not less than about $10^{-3}$ S/cm, and more preferably not less than $10^{-1}$ S/cm. When the proton conductivity was not less than $10^{-3}$ S/cm, attaining an effective proton conductivity of $10^{-1}$ S/cm was enabled by decreasing the thickness of the proton conductive gel 11 in FIG. 1, or by lowering the interfacial resistance between the anode electrode 12 and the cathode electrode 13.

Figure 8:
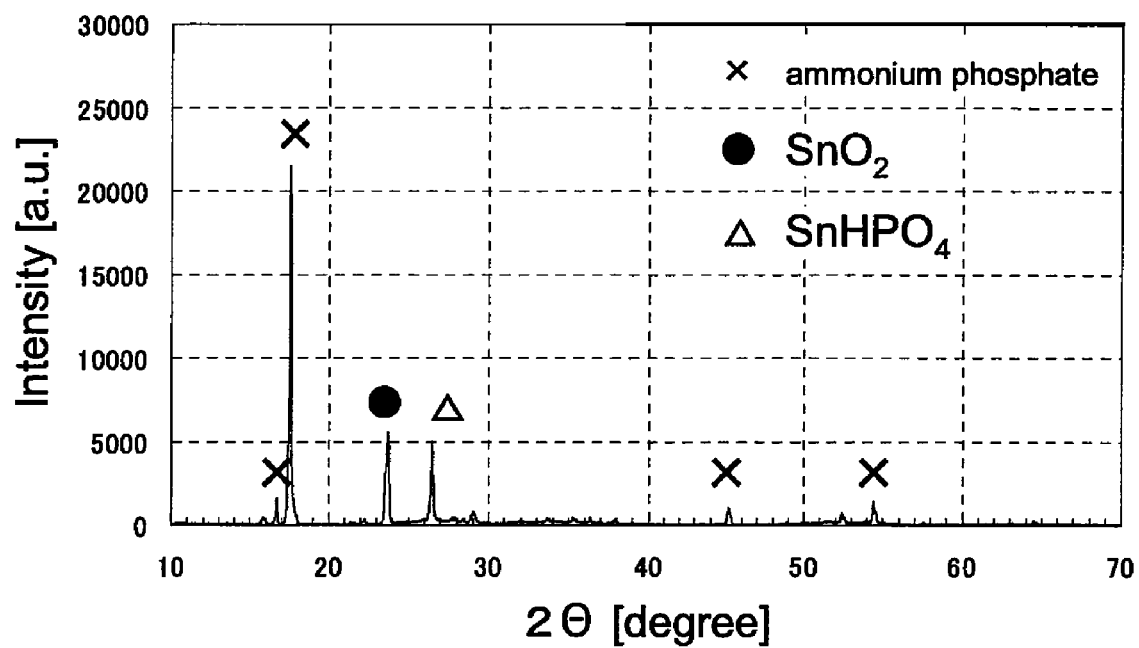
FIG. 8 shows an X-ray diffraction graph when X is 200, and Y is 5.

On the other hand, FIG. 8 shows one example of X-ray diffraction of the sample having the X value in the range exceeding 5 that results in clouding of the gel. FIG. 8 shows an X-ray diffraction graph when X is 200, and Y is 5. When the X value was high, the gel was clouded, and ammonium dihydrogen phosphate or diammonium hydrogen phosphate was detected in the X-ray diffraction graph, further, $SnHPO_4$ was also detected. Since a crystal phase distinct from $SnO_2$ was detected, the sample having the X value in the range exceeding 5 was proven to have a mixed phase of $SnO_2$ and the aforementioned compounds.

The reason for this phenomenon was supposed to involve excess $NH_3$ in an amount more than that required for allowing $SnO_2$ to be stably dispersed, which reacts with $H_3PO_4$ in $H_2O$, and precipitates as an ammonium phosphate compound. Accordingly, the excess compound which did not form a network as described above was believed to affect the proton conductivity or water holding capacity as described later.

Figure 9:
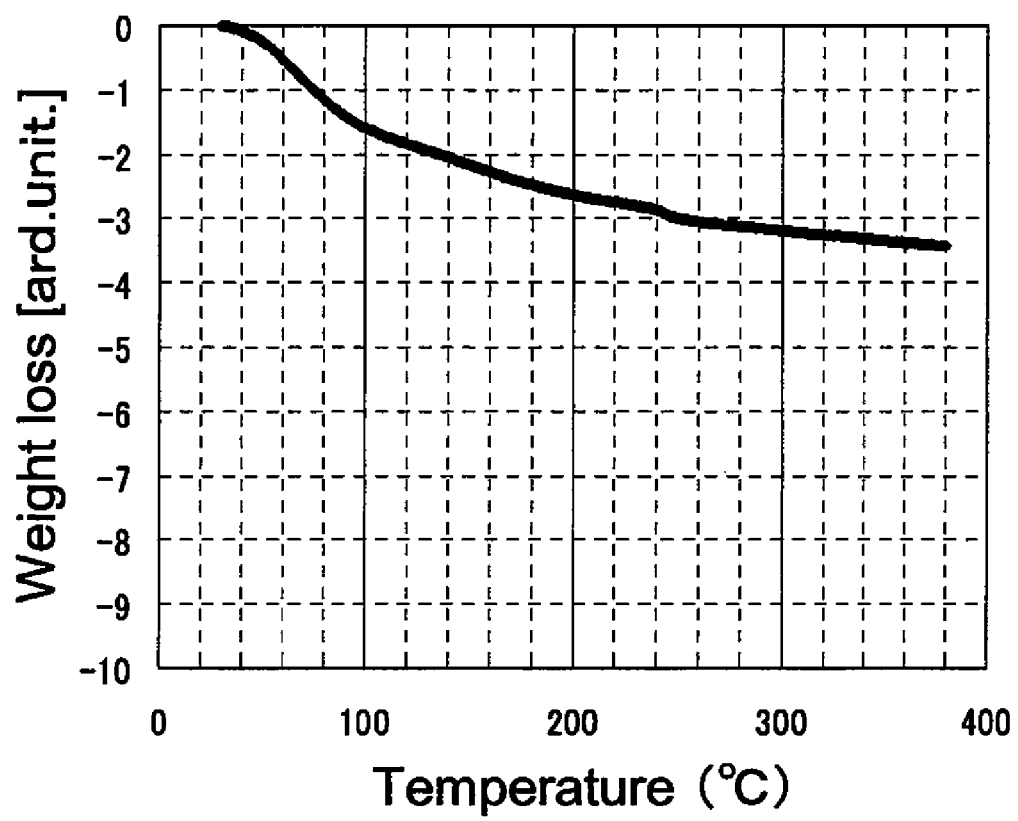
FIG. 9 shows a graph demonstrating results of a thermal analysis of the proton conductive gel (X=0.2, Y=3) in the present invention.

On the other hand, FIG. 9 shows a graph of a thermal analysis of the proton conductive gel produced by mixing with stirring at 80° C. (X=0.2, Y=3). From this graph, free $H_2O$ or desorption of adsorbed $H_2O$ was found at not higher than 100° C. Evaluation of the water content at 100° C., and alteration of the weight and alteration of the water content at 100° C. to 200° C. was enabled by taking into consideration the weight when the temperature was 100° C., and initial loaded weight.

As described above, the proton conductive gel used in the present invention was composed of $SnO_2$, $NH_3$, $H_2O$ and $H_3PO_4$, and revealed to be a gel that is stable in the temperature range of 100° C. to 200° C. without generating a novel compound (precipitate) by way of any reaction of respective constituents.

Furthermore, the gel having a composition in the range represented by $0.2 \leq X \leq 5$, and $1.6 \leq Y \leq 3$ was revealed to be suitable as an electrolyte for fuel cells since the proton conductivity is not less than $1 \times 10^{-3}$ S/cm.

Next, one example of the results of evaluation on water holding capacity of the proton conductive gel 11 used in the present invention is shown in Table 3 (X=0.2).

TABLE 3

| | Y (X = 0.2) | | | | | |
|---|---|---|---|---|---|---|
| | 1 | 1.6 | 2 | 3 | 4 | 5 |
| Weight loss [%] up to 200° C. | 70 | 27 | 18 | 14 | 22 | 14 |
| Weight loss, 100° C. to 200° C. [%] | 3 | 4 | 6 | 5 | 7 | 8 |
| Remaining water content [%] (when the temperature was 200° C.) | | 49 | 46 | 44 | | |

The water holding capacity of the gel was evaluated based on the proportion of weight loss up to 200° C., and the weight loss in the range of 100° C. to 200° C. In the stage of producing the proton conductive gel 11, $H_2O$ was contained excessively, and the initial water content was about 80% of the total loaded weight. The mixture was heated at 80° C. from this state, and mixed while stirring to remove the excess moisture. The amount of dehydration when heated from this state up to 200° C., and the amount of dehydration in the temperature range of 100° C. to 200° C. are shown in Table 3.

As is clear from Table 3, in the range of Y being less than 1.6, the amount of dehydration in the temperature range of 100° C. to 200° C. was small, where as the degree of the weight loss up to 200° C. was great. This indicates that the amount of $H_2O$ retained by a weak bond by adsorption, as in the temperature range of 80° C. to 100° C. was great, revealing that the network formation was insufficient in the range of Y being less than 1.6. On the other hand, in the range of Y being greater than 3, the state formed was not gel but sol although the degree of the weight loss was small.

To the contrary, according to the proton conductive gel 11 used in the present invention, it was proven that the change rate of weight at 100° C. to 200° C. was 4 to 6%, suggesting very superior weight stability. The water content of the proton conductive gel after additionally elevating the temperature to 200° C. was 44% to 49% on the weight basis, revealing that it had very high water content in terms of the weight fraction.

Although $SnO_2 \cdot nH_2O$ disclosed in Nonpatent Document 1 includes $H_2O$ such as $H_2O$ in $SnO_2$ crystals, adsorbed water adsorbed on $SnO_2$ particles and free water. The adsorbed water and free water are desorbed at about 100° C. or not higher than 100° C., and causes great change in the weight because interaction between $SnO_2 \cdot nH_2O$ with $H_2O$ is weak. On the other hand, water in the $SnO_2$ crystal structure is present even at a temperature of not lower than 100° C., but the weight of $H_2O$ occupying the entirety was at most approximately 20% by weight when n is 2. In view of such findings, the proton conductive gel 11 used in the present invention is revealed to have high water content and a high water holding capacity.

Figure 11:
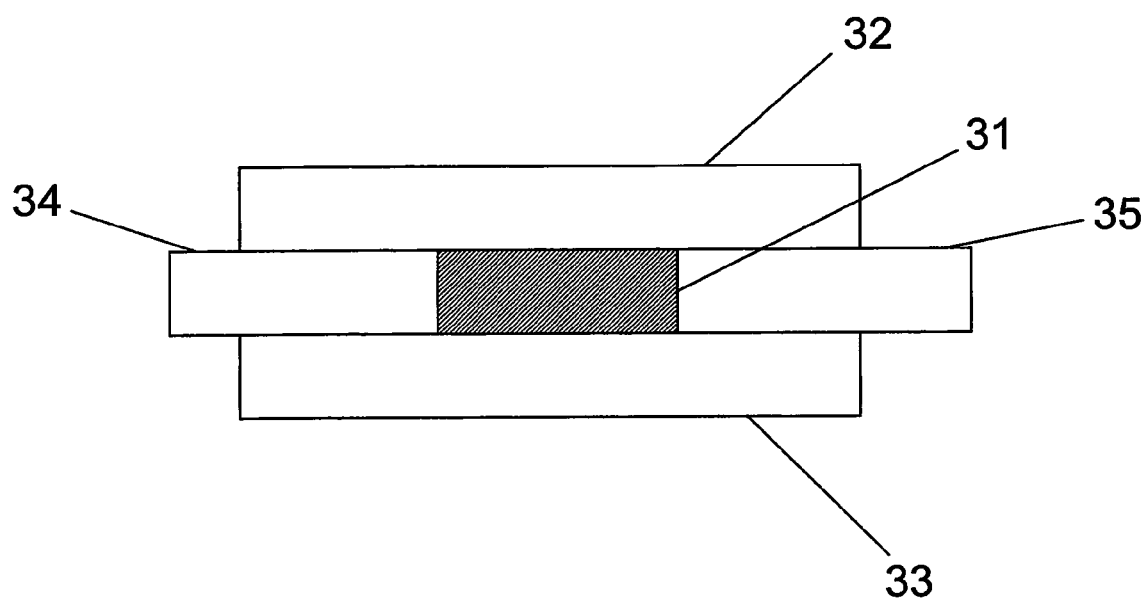
FIG. 11 shows a schematic configuration view illustrating a sample piece upon evaluation of electric power generation characteristics of the fuel cell in which a proton conductive gel of the present invention is used.

As described hereinabove, it was proven that the proton conductive gel 11 used in the fuel cell of the present invention had many features. A fuel cell was manufactured by way of trial using such proton conductive gel 11, and an example of study on expression of functions as a fuel cell is described in detail with reference to FIG. 11.

A sample piece having a similar constitution to that in measurement of the proton conductivity was produced. This sample piece was different from that produced for the measurement of the proton conductivity shown in FIG. 7 in that electrode sheets supporting a Pt catalyst were used as electrode sheets 32 and 33.

An $H_2$ gas was supplied to the electrode sheet 32 corresponding to the anode side, whereas an $O_2$ gas was supplied to the electrode sheet 33 corresponding to the cathode electrode side, the anode side and the cathode side are separated by insulators 34 and 35 formed of a polyimide tape such that the $H_2$ gas and the $O_2$ gas are not mixed. Then, the voltage generated between the anode electrode and the cathode electrode, and the electric current via the loaded resistance were measured. Thus, capability of electric power generation at a temperature of not lower than 100° C. was verified. Specifically, the voltage generated between the anode electrode and the cathode electrode was 0.85 volt, and the electric current via the loaded resistance (electric current density) was 1.1 mA/cm$^2$.

As described in the foregoing, it was revealed that a fuel cell operable at not lower than 100° C. can be constituted by using as a proton conductor a homogeneous gel that ensures a high proton conductivity and water holding capacity, according to the fuel cell of the present invention in which a proton conductive gel is used.

Comparative Examples

The most important aspect of the fuel cell of the present invention is production of a proton conductive gel.

The network structure of the proton conductive gel used in the present invention is believed to be obtainable when an alkali or acid ion is added as a counter ion to $SnO_2$ particles. Thus, in order to elucidate the effect of production of a network structure by a counter ion, Comparative Examples with varying each constitutive ion are described below.

Gels of Comparative Examples were prepared by changing the Sn source to $SnCl_2$, the counter ion source to NaOH or $(HCOOH)_2$, and the acid to $H_2SO_4$, respectively. Stability of the gels of these Comparative Examples is shown in Table 4.

TABLE 4

| Sn source | Counter ion | Acid | | |
|---|---|---|---|---|
| $SnO_2$ | $NH_3$ | $H_3PO_4$ | $H_2O$ | Gelation with Y = 1 to 3 (X = 0.2) |
| $SnO_2$ | $NH_3$ | $H_2SO_4$ | $H_2O$ | X (precipitation separated) |
| $SnO_2$ | NaOH | $H_3PO_4$ | $H_2O$ | X (precipitation separated) |
| $SnO_2$ | $(HCOOH)_2$ | $H_3PO_4$ | $H_2O$ | X (precipitation separated) |
| $SnCl_2$ | $NH_3$ | $H_3PO_4$ | $H_2O$ | X (precipitation separated) |

It was ascertained that when $H_3PO_4$ was changed to $H_2SO_4$, or $NH_3$ was changed to NaOH, the gel constitutions did not form a network. When these constitutions are altered, precipitation of $SnO_2$, and/or phase separation occurred, leading to failure in producing a proton conductive gel that is preferable for use in the present invention. Namely, it was ascertained that a homogenous proton conductive gel was produced only in combination of $SnO_2$, $NH_3$, $H_3PO_4$ and $H_2O$.

Furthermore, in the initial stage of producing the proton conductive gel, about 90% of total weight was $H_2O$ in Comparative Examples shown in Table 4. The amount of $H_2O$ is acceptable as long as it is in excess with respect to $SnO_2$, $H_3PO_4$ and $NH_3$, and thus $H_2O$ other than that necessary for the network in the steps of heating with mixing and stirring is eliminated outside the system. As a result, a stable network is formed; therefore, it is proven that the amount of $H_2O$ in the initial stage is allowable when it is in sufficiently excess.

Namely, in the proton conductive gel used in the present invention, it is necessary to allow $H_2O$ molecules having a binding force comparable to the structural water of $SnO_2$ to be present in the gel. For this purpose, it was proven that formation of a network having high interaction between $H_2O$ and other constituents is important.

Also from the foregoing, the results of the aforementioned production method and evaluation tests suggest that the proton conductive gel 11 in the fuel cell of the present invention has a thermal stable gelatinous state with favorable homogeneity as a result of formation of a network of $SnO_2$, $NH_3$, $H_2O$ and $H_3PO_4$, one another. Such a network having thermal weight stability has not been reported heretofore, and thus construction of a novel network was supposed.

Figure 10:
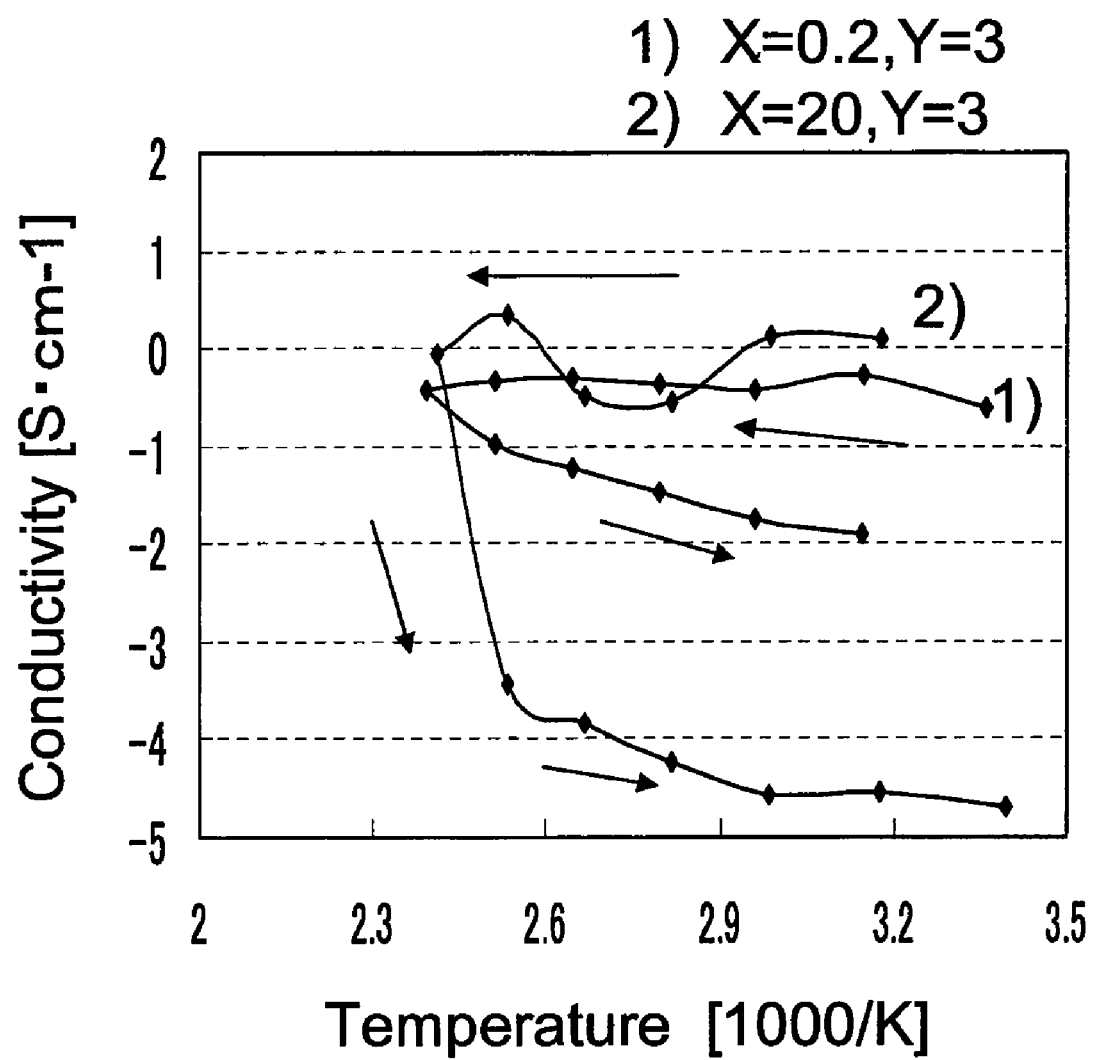
FIG. 10 shows a graph demonstrating proton conducting characteristics when X is 0.2 and Y is 3, and X is 20 and Y is 3.

Furthermore, comparison of proton conducting characteristics between the composition of the proton conductor used in the present invention, and the composition to give the X value exceeding 5 is described with reference to FIG. 10. In FIG. 10, "1)" shows the result of measurement of the proton conductivity when X is 0.2 and Y is 3; and "2)" shows the result of measurement of the proton conductivity when X is 20 and Y is 3.

Upon measurement of the proton conductivity, the temperature of the gel sample was elevated from the room temperature to 150° C., and thereafter lowered to the room temperature. According to the composition "1)" in a suitable range as a proton conductive gel, the water holding capacity was superior, and a network state also superior in the homogeneity was inferred; however, great hysteresis of the proton conductivity was not observed.

However, in the range of the composition "2)", i.e., in the range with $NH_3$ being in excess and yielding precipitation of an ammonium phosphate compound, exhibiting great hysteresis of the proton conductivity was ascertained by decreased water holding capacity and thermal stability presumed to result from disruption of balance of the network. Since the thermal instability of such a proton conductivity is observed as alteration of the conductivity in practical applications of fuel cells, disadvantages as a proton conductor was suggested.

As described above, in the composition range of the proton conductive gel used in the present invention, formation of a homogenous gel concomitant with providing a stable state also for proton conducting characteristics revealed. This effect was believed to account for formation of a network of the gel constituents to be present in a state with strong interaction.

In addition, it was found that the proton conductive gel used in the present invention is a gel being superior homogeneity and thermal stability in a temperature range of not lower than 100° C., and having high water content. Furthermore, it was also proven that a high proton conductivity in the order of not less than $10^{-3}$ S/cm stably exhibited.

As described in detail above, the proton conductive gel used in the present invention is advantageous in high weight stability, homogeneity and high water content in a temperature range of not lower than 100° C., and also a high proton conductivity is exhibited; therefore, it can be a most suitable proton conductor for use in solid electrolyte membranes of fuel cells.

Furthermore, due to having a sol state in the initial loading step for producing the gel, a proton conductive gel can be easily formed even on sites having a variety of shapes. In addition, since gelation is enabled via the heating step at not lower than 80° C., it is applicable as a proton conductive gel having high shape followability.

From the description hereinabove, many modifications and other embodiments of the present invention are apparent to persons skilled in the art. Accordingly, the foregoing description should be construed merely as an illustrative example, which was provided for the purpose of teaching best modes for carrying out the present invention to persons skilled in the art. Details of the construction and/or function of the present invention can be substantially altered without departing from the spirit thereof.

Industrial Applicability

According to the fuel cell of the present invention, since the proton conductive gel is advantageous in high proton conductivity as well as homogeneity, thermal weight stability and high water content, it is operable at not lower than 100° C. by utilizing proton conduction via $H_2O$.

REFERENCE SIGNS LIST 11 proton conductive gel
12 anode electrode
13 cathode electrode
14 insulator
15 insulator
21 proton conductive gel
22 electrode sheet
23 electrode sheet
24 insulator
25 insulator
31 proton conductive gel
32 electrode sheet
33 electrode sheet
34 insulator
35 insulator

The invention claimed is:

1. A fuel cell comprising;
a proton conductive gel;
an anode electrode; and
a cathode electrode,
the proton conductive gel being sandwiched between the anode electrode and the cathode electrode, wherein
the proton conductive gel is composed of $SnO_2$, $NH_3$, $H_2O$, and $H_3PO_4$,
and provided that the molar ratio represented by $NH3/SnO2$ is X, and the molar ratio represented by P/Sn is Y, X is not less than 0.2 and not greater than 5, and Y is not less than 1.6 and not greater than 3.

2. The fuel cell according to claim 1, wherein the proton conductive gel has a conductivity of not less than $10^{-3}$ S/cm in the temperature range of not lower than 100° C. and not higher than 200° C.

3. A method for manufacturing a fuel cell comprising
a proton conductive gel, an anode electrode, and a cathode electrode,
the method comprising the steps of: mixing $H_3PO_4$ with a solution composed of $SnO_2$, $NH_3$, and $H_2O$ to obtain the proton conductive gel, wherein
provided that the molar ratio represented by $NH_3/SnO_2$ is X, the molar ratio represented by P/Sn is Y, X is not less than 0.2 and not greater than 5, and Y is not less than 1.6 and not greater than 3; and
sandwiching the proton conductive gel between the anode electrode and the cathode electrode,
in this order.

4. The method for manufacturing a fuel cell according to claim 3, wherein the proton conductive gel has a conductivity of not less than $10^{-3}$ S/cm in the temperature range of not lower than 100° C. and not higher than 200° C.

5. A method for generating an electric power by a fuel cell, the fuel cell comprising
a proton conductive gel,
an anode electrode, and
a cathode electrode,
the proton conductive gel being sandwiched between the anode electrode and the cathode electrode, wherein
the proton conductive gel is composed of $SnO_2$, $NH_3$, $H_2O$, and $H_3PO_4$,
provided that the molar ratio represented by $NH_3/SnO_2$ is X, and the molar ratio represented by P/Sn is Y,
X is not less than 0.2 and not greater than 5, and Y is not less than 1.6 and not greater than 3, and wherein
the method comprises the step of:
supplying hydrogen to the anode electrode and supplying oxygen to the cathode electrode while maintaining the fuel cell in a temperature range of not lower than 100° C. and not higher than 200° C. to generate a potential difference between the anode electrode and the cathode electrode.

6. The method according to claim 5, wherein the proton conductive gel has a conductivity of not less than $10^{-3}$ S/cm in the temperature range of not lower than 100° C. and not higher than 200° C.

* * * * *